United States Patent Office

2,758,097
Patented Aug. 7, 1956

2,758,097

REACTIVATION OF METAL-POISONED CATALYSTS

Harry G. Doherty, Pitman, and Charles J. Plank, Woodbury, N. J., assignors to Socony Mobil Oil Company, Inc., a corporation of New York No Drawing. Application November 4, 1952, Serial No. 318,746

12 Claims. (Cl. 252—413)

This invention relates to a process for treating a catalytic composite useful in the conversion of higher boiling hydrocarbons to lower boiling hydrocarbons such as gasoline. More particularly, the present invention is concerned with a method for treating siliceous cracking catalysts poisoned by metal contaminants. The present invention is specifically directed to a method for reactivating siliceous cracking catalysts which have become poisoned during hydrocarbon conversion operations by the contaminating effects of minute amounts of nickel.

Siliceous cracking catalysts, including naturally occurring activated clays and synthetically prepared composites, have long been recognized as useful in catalytically promoting hydrocarbon conversion reactions. Such siliceous catalysts contains silica and one or more metal oxides. In clays, the metal oxide present is predominantly alumina. Active synthetic cracking catalysts are generally gels or gelatinous precipitates and include silica-alumina, silica-zirconia, silica-beryllia, and silica-magnesia, as well as ternary combinations such as silica-alumina-zirconia, silica-alumina-beryllia, and silica-alumina-magnesia. Ordinarily, this type of catalyst contains silica and at least one material selected from the group of alumina, zirconia, beryllia, and magnesia. Other metal oxides may also be present, if desired, generally in small percentage, such as those of manganese, chromium, titanium, tungsten, molybdenum, and calcium. Synthetic siliceous cracking catalysts may be prepared by various well known methods, such as by cogelation or coprecipitation of the silica and metal oxide, or by milling together the separately precipitated or gelled components. Alternatively, the metal oxide may be combined with a previously formed siliceous gel utilizing impregnation or base exchange techniques. The present invention, however, it not limited to catalyst prepared by any particular method but is of general application to siliceous cracking catalysts. It will thus be understood that the catalysts undergoing treatment in accordance with the present invention may be any of the siliceous cracking catalysts heretofore customarily employed, which are susceptible to poisoning by the presence of nickel contaminant. It will further be understood that the treatment described herein may be performed on metal-poisoned catalysts before the same have been used in hydrocarbon conversion or on metal-poisoned catalysts which have been previously utilized in promoting the conversion of hydrocarbons.

Commercial catalytic cracking is carried out by contacting a hydrocarbon charge in the vapor or liquid state with a catalyst of the foregoing type under conditions of temperature, pressure, and time to achieve substantial conversion of the charge to lower boiling hydrocarbons. This cracking reaction results in deposition of a carbonaceous deposit commonly called "coke" with consequent decline in catalytic activity of the catalyst. Under conditions to obtain efficient operation from a yield standpoint, it is found desirable to terminate the cracking reaction after a relatively short conversion run, for example, of from 5 to 15 minutes on stream, and thereafter to restore the activity of the catalyst by burning off the coke in a regeneration stage. The formation of coke represents a net loss, since hydrocarbons are consumed in its production. In addition, it is apparent that the greater the coke deposit, the longer the regeneration period would have to be in proportion to the on-stream period in order not to exceed deterimental temperature levels during regeneration.

Minute amounts of nickel are highly deterimental to the efficiency of the siliceous cracking catalysts above described. Such catalysts, contaminated even with an extremely small amount of nickel, exhibit decreased activity and excessive coke formation during cracking reactions. In fact, commercial experience with such a poisoned catalyst shows about 50 per cent more coke make by the catalyst at equilibrium activity than is produced by the catalyst in unpoisoned condition. Furthermore, since the major portion of the catalyst remains in the cracking system over an extended period of time with recirculation, the amount of nickel contaminant gradually builds up to such a point that further contact of the cracking charge with the catalyst becomes an uneconomical operation. The nickel contaminant may be introduced during preparation of the catalyst, or it may be introduced with the charge stock, or it may be eroded from the equipment. Regardless of its manner of introduction, the presence of nickel contaminant in the siliceous cracking catalyst employed is definitely detrimental, leading to the production of an excessive amount of coke.

The poisoning effects of minute amounts of nickel on siliceous cracking catalysts have heretofore been recognized in the art. Various techniques have been suggested to remove the nickel contaminant. In general, such techniques have involved rather drastic measures, including chemical attack on the nickel poison. In some cases, excessive heat treatment has been suggested for removing the nickel contaminant despite the danger of surface destruction in the catalyst due to sintering.

It is a major object of this invention to overcome the difficulties caused by the poisoning effects of nickel contaminant on the conversion efficiency of siliceous cracking catalysts. A more specific object is the provision of a method for reducing excessive coke formation on siliceous cracking catalysts contaminated with minute amounts of nickel without restorting to the drastic measures necessary to remove the nickel. A further object is to provide a process for reactivation of such contaminated catalyst.

The above and other objects which will be apparent to those skilled in the art are achieved by the process described herein. Broadly, the present invention involves reactivation of a nickel-poisoned siliceous cracking catalyst by impregnating the same with phosphorus pentoxide. Such treatment, under conditions set forth hereinafter, has been discovered to afford a surprisingly low coke-forming catalyst. It has further been discovered that additional improvement in the gasoline/coke ratio is obtained by a subsequent mild steam treatment.

The catalysts treated in accordance with the present invention include both synthetic and natural siliceous composites containing a major proportion of silica and a minor proportion of one or more metal oxides as described above. The catalysts treated in accordance with the present process are further characterized by the presence therein of a small amount of nickel contaminant. Generally, a very minute amount of nickel, as low as 0.006 per cent by weight of the catalytic composite, will exert a detrimental poisoning effect on the cracking characteristics of the described siliceous cracking catalysts. It is contemplated that such siliceous catalysts contaminated with nickel up to the extent of about 0.20 per cent by weight may be effectively reactivated in accordance with the present invention.

In practice of the invention, a nickel-poisoned siliceous cracking catalyst is impregnated with phosphorus pentoxide. The impregnation may be carried out in any feasible manner and generally by contacting the poisoned catalyst with a solution of a phosphorus compound, which decomposes to leave a residue of phosphorus pentoxide after calcination. The impregnation may be carried out either batch-wise, in which case the catalyst is permitted to remain in contact with the impregnating solution under generally static conditions for a predetermined length of time and is then removed therefrom, or treatment may be effected by continuously percolating the impregnating solution through a bed of the catalyst. The deactivated catalyst may also be impregnated in situ by the addition of an oil-soluble phosphorus compound to the charge stock, which lays down a deposit of phosphorus pentoxide on the catalyst under the prevailing hydrocarbon conversion conditions, causing deactivation of the nickel poison as the charge stock is contacted with the catalyst. This latter method is particularly attractive from a commercial standpoint since it represents a method of reactivation which eliminates the need for unscheduled shut-downs, thereby realizing considerable economic advantages. In some cases, vaporous impregnation of the poisoned catalyst may be desirable. In such method, the poisoned catalyst is brought into contact with vapors of a phosphorus compound which, upon subsequent calcination, will leave a residue of phosphorus pentoxide.

The amount of phosphorus pentoxide deposited on the nickel-poisoned catalyst and the conditions under which impregnation is carried out are such as to substantially overcome the poisoning effects of the nickel contaminant, thereby improving the cracking characteristics of the catalyst, as indicated by an increase in the gasoline-to-coke ratio. Without being limited by any theory, it is postulated that the nickel poison may be rendered inactive by combination with the phosphorus pentoxide and that subsequent steam treatment aids this combination, thereby rendering the nickel catalytically inactive in so far as its tendency to produce coke is concerned. This postulation finds support in the fact that the nickel content of the catalyst is not diminished by the present treatment and, further, in that subsequent steam-treatment of the phosphorus pentoxide-impregnated catalyst brings about a further increase in the cracking efficiency of such catalyst. It is accordingly to be understood that the amount of phosphorus pentoxide deposited on the nickel-poisoned catalyst cannot be strictly defined but, rather, is of such quantity as to bring about a substantial improvement in the cracking efficiency of the poisoned catalyst, as indicated by an increase in the gasoline-to-coke ratio. Generally, however, the amount of phosphorus pentoxide deposited on the nickel-poisoned catalyst, in accordance with the present process, is a small amount, less than 2 per cent by weight of the catalyst.

The phosphorus compound used for impregnating is one which will decompose to leave a residue of phosphorus pentoxide upon subsequent calcination of the catalyst. The impregnation may be effected with a solution of such compound in an appropriate solvent, or the poisoned catalyst may be contacted with vapors of a suitable phosphorus compound. When aqueous solutions of the phosphorus compound are employed, the compound is generally an inorganic salt, such as diammonium hydrogen phosphate or ammonium dihydrogen phosphate. On the other hand, if the phosphorus compound is added to the petroleum charge stock, it should be oil-soluble, and consequently organic phosphorus compounds will generally be employed under such conditions. Suitable compounds for such method of operation include phosphate esters, phosphonates and phosphines, and organic sulfur compounds of phosphorus.

After impregnation, the catalyst is dried and calcined at an elevated temperature sufficient to effect deposition of phosphorus pentoxide on the catalyst by decomposition of the particular phosphorus-impregnating compound used. As an optional subsequent treatment, the phosphorus pentoxide-impregnated catalyst may be subjected to a mild steam-treatment. The exposure of the impregnated catalyst to steam is, as will appear from data set forth hereinafter, a desirable step in the present reactivation procedure. Such treatment may be carried out at a temperature within the approximate range of 800 to 1500° F. for at least about 2 hours. Usually, steam at a temperature of about 1000 to 1300° F. will be used, with the treating period extending from about 2 to about 48 hours. Temperatures above 1500° F., and generally above 1300° F. for the clay catalysts, may be detrimental and should be avoided. As long as critically high temperatures, which cause rapid shrinkage or sintering of the catalyst, are avoided, longer periods of treatment than above designated apparently have no adverse effect. Also, an atmosphere consisting principally of steam, but containing air or other gas substantially inert with respect to the composite being treated, may be used and such mixtures are, in fact, desirable with the use of the more elevated temperatures to avoid possible deactivation of the catalyst.

After the above-described impregnation and optional steam-treatment, the catalyst is in a reactivated state and may be introduced or returned to the conversion chamber of the cracking unit for further use in catalytically promoting the conversion of higher boiling hydrocarbons to hydrocarbons boiling in the range of gasoline.

The following examples will serve to illustrate the process of the invention without limiting the same:

EXAMPLE 1

A siliceous cracking catalyst containing approximately 90.85 per cent $SiO_2$, 9 per cent $Al_2O_3$, and 0.15 per cent $Cr_2O_3$ was utilized in a compact moving bed catalytic cracking unit over a period of 141 days for approximately 5 to 6 cycles a day of alternate conversion and regeneration for the cracking of a mixture of California virgin gas oils. The catalyst, after such use, was found to be poisoned and the poisoning effects were discovered to be due to the presence in the catalyst of a minute amount of nickel to the extent of about 0.01 per cent by weight.

The above-poisoned catalyst was reactivated by dissolving sufficient tri-o-cresyl phosphate in a gas oil to give a deposition of 0.5 per cent by weight of $P_2O_5$ on the catalyst, and passing the gas oil over the poisoned catalyst at 800° F., employing a liquid hourly space velocity of 1.0 at atmospheric pressure. At the conclusion of the cycle, the coke was burned and the catalyst again treated with gas oil containing the tri-o-cresyl phosphate to give a total deposit of 1 per cent by weight of $P_2O_5$ on the catalyst. The coke formed was again removed by burning and the catalyst was evaluated in the standard CAT–A activity test. The impregnated catalyst was given a steam treatment with 100 per cent steam at 1100° F. for 24 hours and the resultant catalyst was also evaluated in the standard CAT–A test. The comparative results of testing the untreated poisoned catalyst, the phosphorus pentoxide-impregnated catalyst, and the phosphorus pentoxide-impregnated catalyst treated with steam are set forth below:

Table I

| Treatment to Catalyst | None | Impregnation with 1% $P_2O_5$ from tri-o-cresyl phosphate in oil | Impregnation with 1% $P_2O_5$ from tri-o-cresyl phosphate in oil+steam treatment |
|---|---|---|---|
| Ni content of catalyst, p. p. m | 102 | 102 | 102 |
| CAT-A Data: | | | |
| Bulk Density | 0.76 | 0.75 | 0.75 |
| Gas Gravity | 1.09 | 1.16 | 1.30 |
| Gas, Percent Wt | 6.7 | 5.9 | 3.8 |
| Coke, Percent Wt | 2.5 | 2.0 | 1.4 |
| Gasoline, Percent Vol. at 410° F | 29.2 | 28.5 | 27.3 |
| Gasoline/Coke | 11.7 | 14.3 | 19.5 |

From the above data, it will be seen that impregnation of the nickel-poisoned catalyst with phosphorus pentoxide resulted in a marked improvement in the coke-forming tendencies of the catalyst, with resultant increase in the gasoline/coke ratio as well as a favorable decrease in gas make and increase in gas gravity. It will also be noted that subsequent steam-treatment of the impregnated catalyst further reduced the coke-forming tendencies of the poisoned catalyst and brought about a still further improvement in the resulting gasoline/coke ratio.

EXAMPLE 2

A sample of 187.5 grams of the poisoned catalyst described in Example 1 was reactivated by contacting with 270 cc. of 1.75 per cent aqueous diammonium hydrogen phosphate solution for 24 hours. The catalyst was then removed from the solution, dried, and calcined at 1000° F. for about 16 hours. The resultant catalyst, having a deposition of 1 per cent by weight of $P_2O_5$, was evaluated in the standard CAT-A activity test. The impregnated catalyst was given a steam treatment with 100 per cent steam at 1100° F. for 24 hours and the resultant catalyst was also evaluated in the standard CAT-A test. The comparative results of testing the untreated poisoned catalyst, the phosphorus pentoxide-impregnated catalyst, and the phosphorus-impregnated catalyst treated with steam are set forth below:

Table II

| Treatment to Catalyst | None | Impregnation with 1% $P_2O_5$ from aqueous $(NH_4)_2HPO_4$ solution | Impregnation with 1% $P_2O_5$ from aqueous $(NH_4)_2HPO_4$ solution+steam-treatment |
|---|---|---|---|
| Ni content of catalyst, p. p. m | 102 | 102 | 102 |
| CAT-A Data: | | | |
| Bulk Density | 0.76 | 0.75 | 0.75 |
| Gas Gravity | 1.09 | 1.10 | 1.33 |
| Gas, Percent Weight | 6.7 | 6.8 | 4.8 |
| Coke, Percent Wt | 2.5 | 2.0 | 1.6 |
| Gasoline, Percent Vol. at 410° F | 29.2 | 31.2 | 28.4 |
| Gasoline/Coke | 11.7 | 15.6 | 18 |

From the foregoing data, it will again be seen that the impregnation of the nickel-poisoned catalyst with $P_2O_5$ resulted in a reduction in coke formation and an improvement in the gasoline/coke ratio. Subsequent steam treatment of the impregnated catalyst further served to improve the reduction in coke and increase in gasoline/coke ratio.

EXAMPLE 3

A siliceous synthetic gel cracking catalyst containing about 93 per cent $SiO_2$ and about 7 per cent $Al_2O_3$, and contaminated with approximately 432 p. p. m. of nickel was tested in the standard CAT-A activity test. The product gave a very high coke yield.

A sample of the contaminated catalyst (130.8 grams) was contacted with 160 cc. of 1.9 per cent aqueous ammonium dihydrogen phosphate solution for 16 hours. The catalyst was then removed from the solution, dried, and calcined at 1000° F. for about 16 hours. The treated catalyst, having a deposition of 0.87 per cent by weight of $P_2O_5$ was given a steam treatment with 100 per cent steam at 1200° F. for 10 hours and this catalyst also was evaluated in the CAT-A test. The comparative results of testing the untreated poisoned catalyst and the phosphorus pentoxide-impregnated—steam-treated catalyst, as well as the steam-treated catalyst without preliminary $P_2O_5$ impregnation, are set forth below:

Table III

| Treatment to Catalyst | None | Steam-treated [1] | Impregnated with 0.87% $P_2O_5$ and Steam-treated [1] |
|---|---|---|---|
| Ni content of catalyst, p. p. m | 432 | 432 | 432 |
| CAT-A Data: | | | |
| Bulk Density | 0.63 | 0.67 | 0.73 |
| Gas Gravity | 0.86 | 0.72 | 1.06 |
| Gas, percent Wt | 13.0 | 5.9 | 6.5 |
| Coke, percent Wt | 6.4 | 2.7 | 1.8 |
| Gasoline, percent Vol. at 410° F | 32.1 | 22.9 | 28.7 |
| Gasoline/Coke | 5 | 8.5 | 16 |

[1] Steam-treating conditions were 1200° F./10 hrs/100% steam.

From the above data, it will be noted that steam treatment of the poisoned silica-alumina gel catalyst reduced the coke-forming tendencies and gave an improvement in gasoline/coke ratio. When the catalyst was impregnated with phosphorus pentoxide prior to steam treatment, a distinct improvement in coke formation was obtained along with an improvement in gasoline yield, giving a marked increase in the gasoline/coke relationship.

EXAMPLE 4

A siliceous clay cracking catalyst of the acid-activated montmorillonite type contaminated with about 243 p. p. m. of nickel was tested in the standard CAT-A activity test. The product gave a high coke yield.

A sample of the contaminated catalyst (222 grams) was contacted with 260 cc. of 1.49 per cent aqueous ammonium dihydrogen phosphate solution for 16 hours. The catalyst was then removed from the solution, dried, and calcined at 1000° F. for about 16 hours. The treated catalyst, having a deposition of 0.66 per cent by weight of $P_2O_5$ was given a steam-treatment with 100 per cent steam at 1200° F. for 10 hours and this catalyst was evaluated in the CAT-A test. The comparative results of testing the untreated poisoned catalyst and the phosphorus pentoxide-impregnated—steam-treated catalyst, as well as the steam-treated catalyst without preliminary $P_2O_5$ impregnation, are set forth below:

Table IV

| Treatment to Catalyst | None | Steam-treated [1] | Impregnated with 0.66% $P_2O_5$ and Steam-treated [1] |
|---|---|---|---|
| Ni content of catalyst, p. p. m | 243 | 243 | 243 |
| CAT-A Data: | | | |
| Bulk Density | 0.76 | 0.74 | 0.76 |
| Gas Gravity | 1.22 | 1.30 | 1.23 |
| Gas, Percent Wt | 6.7 | 4.7 | 3.5 |
| Coke, Percent Wt | 3.3 | 2.3 | 2.1 |
| Gasoline, Percent Vol. at 410° F | 33.8 | 27.7 | 29.2 |
| Gasoline/Coke | 10.3 | 12 | 14 |

[1] Steam-treating conditions were 1200° F./10 hrs./100% steam.

Once again, it will be noted that, while steam-treatment of the poisoned clay catalyst reduced coke formation and increased the gasoline/coke ratio, impregnation of the catalyst with phosphorus pentoxide prior to steam-treatment afforded a further marked improvement in coke reduction and increase in gasoline/coke relationship.

It is to be understood that the above description is merely illustrative of preferred embodiments of the invention. While such description has been directed particularly to the reactivation of nickel-poisoned siliceous cracking catalysts, it is contemplated that the method set forth may likewise be applicable for reactivation of various other catalytic composites which may have become poisoned by the presence therein of metal contaminants such as copper, iron, vanadium, and the like.

We claim:

1. A method for treating a siliceous hydrocarbon conversion catalyst poisoned by nickel contaminant, which comprises impregnating the poisoned catalyst with a small amount of phosphorus pentoxide sufficient to overcome the poisoning effects of the nickel.

2. A method for overcoming the poisoning effects of nickel contaminant contained in a siliceous cracking catalyst, which comprises impregnating said catalyst with a small amount of phosphorus pentoxide followed by steam-treatment of the catalyst at a temperature in the range of about 800 to about 1500° F. for at least about 2 hours.

3. A method for treating a nickel-poisoned siliceous cracking catalyst, which comprises contacting said catalyst with a solution of a phosphorus compound, which compound decomposes to leave a residue of phosphorus pentoxide upon subsequent calcination of the catalyst, removing the catalyst from contact with said solution and calcining the catalyst so treated.

4. A method for treating a nickel-poisoned siliceous cracking catalyst, which comprises contacting said catalyst with a solution of a phosphorus compound, which compound decomposes to leave a residue of phosphorus pentoxide upon subsequent calcination of the catalyst, removing the catalyst from contact with said solution, calcining the same and subjecting the calcined catalyst to steam-treatment at a temperature in the range of about 800 to about 1500° F. for at least about 2 hours.

5. A method for reactivating a siliceous cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of phosphorus pentoxide and thereafter subjecting the impregnated catalyst to a mild steam-treatment.

6. A method for reactivating a siliceous cracking catalyst which has been poisoned by a small contaminating amount, less than about 0.20 per cent by weight, of nickel during the conversion of high boiling petroleum hydrocarbons to hydrocarbons boiling in the gasoline range, which comprises contacting said poisoned catalyst with a solution of a phosphorus compound capable of thermal decomposition to a phosphorus pentoxide, removing the catalyst from contact with said solution, calcining the catalyst to effect the aforesaid thermal decomposition, and subjecting the treated catalyst to steam-treatment at a temperature in the range of about 1000 to about 1300° F. for a period of between about 2 and about 48 hours.

7. A method for reactivating a siliceous cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of phosphorus pentoxide by introducing an oil-soluble phosphorus compound into a charge of said high boiling hydrocarbons and thereafter subjecting said charge to cracking conditions.

8. A method for treating a poisoned siliceous cracking catalyst contaminated by a small amount, less than about 0.20 per cent by weight of nickel, which comprises impregnating said catalyst with a phosphorus compound which, upon calcination of the catalyst, forms a small amount, less than about 2 per cent by weight, of phosphorus pentoxide, calcining the impregnated catalyst and subjecting the calcined catalyst to steam-treatment at a temperature in the range of about 800 to about 1500° F. for at least about 2 hours.

9. A method for treating a nickel-poisoned silica-alumina hydrocarbon conversion catalyst, which comprises impregnating the poisoned catalyst with a small amount of phosphorus pentoxide sufficient to overcome the poisoning effects of the nickel.

10. A method for reactivating a siliceous plural oxide gel cracking catalyst which has been poisoned by a small contaminating amount of nickel during the conversion of high boiling petroleum hydrocarbons to hydrocarbons boiling in the gasoline range, which comprises impregnating said poisoned catalyst with a small amount of phosphorus pentoxide and thereafter subjecting the impregnated catalyst to a mild steam-treatment.

11. A method for treating a nickel-poisoned siliceous clay cracking catalyst, which comprises impregnating the poisoned catalyst with a small amount of phosphorus pentoxide and thereafter subjecting the impregnated catalyst to a mild steam-treatment.

12. A method for treating a nickel-poisoned synthetic silica-alumina gel cracking catalyst, which comprises impregnating the poisoned catalyst with a small amount of phosphorus pentoxide and thereafter subjecting the impregnated catalyst to a mild steam-treatment.

References Cited in the file of this patent

UNITED STATES PATENTS

| | | |
|---|---|---|
| 2,120,702 | Ipatieff et al. | June 14, 1938 |
| 2,120,723 | Watson | June 14, 1938 |
| 2,428,741 | Plank | Oct. 7, 1947 |
| 2,569,092 | Deering | Sept. 25, 1951 |
| 2,575,457 | Mavity | Nov. 20, 1951 |
| 2,668,798 | Plank | Feb. 9, 1954 |

FOREIGN PATENTS

| | | |
|---|---|---|
| 280,712 | Great Britain | Nov. 24, 1927 |